(12) United States Patent
Petro et al.

(10) Patent No.: US 11,962,848 B2
(45) Date of Patent: *Apr. 16, 2024

(54) METHODS AND APPARATUS TO IDENTIFY AN EPISODE NUMBER BASED ON FINGERPRINT AND MATCHED VIEWING INFORMATION

(71) Applicant: The Nielsen Company (US), LLC, New York, NY (US)

(72) Inventors: James Petro, Dunedin, FL (US); Sandeep Tapse, Tampa, FL (US); Albert T. Borawski, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,364

(22) Filed: Jun. 13, 2022

(65) Prior Publication Data

US 2023/0064916 A1    Mar. 2, 2023

Related U.S. Application Data

(63) Continuation of application No. 17/459,892, filed on Aug. 27, 2021, now Pat. No. 11,363,332.

(51) Int. Cl.
*H04N 21/442* (2011.01)
*G06Q 20/12* (2012.01)
*G06Q 30/0201* (2023.01)
*H04N 21/435* (2011.01)
*H04N 21/439* (2011.01)

(52) U.S. Cl.
CPC ..... *H04N 21/44204* (2013.01); *H04N 21/435* (2013.01); *H04N 21/4394* (2013.01); *G06Q 20/123* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 4,677,466 | A | 6/1987 | Landron et al. |
| 5,481,294 | A | 1/1996 | Thomas et al. |
| 7,460,684 | B2 | 12/2008 | Srinivasan |
| 9,438,940 | B2 | 9/2016 | Nelson |

(Continued)

OTHER PUBLICATIONS

United States Patent and Trademark Office, "Notice of Allowance and Fee(s) Due," issued in connection with U.S. Appl. No. 17/459,892, dated Feb. 11, 2022, 8 pages.

(Continued)

*Primary Examiner* — James R Marandi

(57) ABSTRACT

Methods, apparatus, systems, and articles of manufacture to identify an episode number based on fingerprint and matched viewing information are disclosed. An example method includes processing meter data to identify a presented media based on a bumper included in a media, filtering the meter data based on the identification of the media, selecting a candidate episode, the candidate episode not associated with a known episode label, determining whether the candidate episode appears sequentially after a known episode for a threshold number of presentation locations, and labeling the candidate episode as the next sequential episode after the known episode in response to determining that the candidate episode appears sequentially after the known episode for the threshold number of presentation locations.

30 Claims, 13 Drawing Sheets

(56) References Cited

U.S. PATENT DOCUMENTS

| | | |
|---|---|---|
| 9,548,830 B2 | 1/2017 | Kariyappa et al. |
| 9,668,002 B1 | 5/2017 | Baron et al. |
| 9,668,020 B2 | 5/2017 | Nelson et al. |
| 10,200,546 B2 | 2/2019 | Nelson et al. |
| 11,363,332 B1 | 6/2022 | Petro et al. |
| 2005/0232411 A1 | 10/2005 | Srinivasan et al. |
| 2006/0153296 A1 | 7/2006 | Deng |
| 2006/0184961 A1 | 8/2006 | Lee et al. |
| 2006/0195861 A1 | 8/2006 | Lee |
| 2007/0050832 A1 | 3/2007 | Wright et al. |
| 2007/0157224 A1 | 7/2007 | Pouliot et al. |
| 2007/0274537 A1 | 11/2007 | Srinivasan |
| 2008/0091288 A1 | 4/2008 | Srinivasan |
| 2008/0276265 A1 | 11/2008 | Topchy et al. |
| 2009/0307084 A1 | 12/2009 | Monighetti et al. |
| 2010/0115543 A1 | 5/2010 | Falcon |
| 2012/0304214 A1 | 11/2012 | Falcon |
| 2013/0007790 A1 | 1/2013 | McMillan |
| 2014/0108441 A1 | 4/2014 | Samari et al. |
| 2015/0289013 A1 | 10/2015 | Nelson et al. |
| 2016/0094877 A1 | 3/2016 | Heffernan et al. |
| 2017/0019708 A1 | 1/2017 | Heffernan et al. |
| 2017/0177584 A1 | 6/2017 | Narasimha et al. |
| 2018/0367868 A1 | 12/2018 | Banger |
| 2019/0037257 A1 | 1/2019 | Nelson et al. |
| 2019/0082219 A1 | 3/2019 | Nelson et al. |
| 2019/0273958 A1 | 9/2019 | Srinivasan |
| 2019/0362405 A1 | 11/2019 | Stone |
| 2020/0213673 A1 | 7/2020 | Major et al. |
| 2021/0377603 A1 | 12/2021 | Wright et al. |

OTHER PUBLICATIONS

United States Patent and Trademark Office, "Notice of Allowability," issued in connection with U.S. Appl. No. 17/459,892, dated Mar. 3, 2022, 5 pages.

United States Patent and Trademark Office, "Non-Final Office Action," issued in connection with U.S. Appl. No. 16/888,203, dated Jan. 14, 2021, 26 pages.

United States Patent and Trademark Office, "Final Office Action," issued in connection with U.S. Appl. No. 16/888,203, dated Aug. 6, 2021, 26 pages.

United States Patent and Trademark Office, "Non-Final Office Action," issued in connection with U.S. Appl. No. 16/888,203, dated Dec. 15, 2021, 27 pages.

United States Patent and Trademark Office, "Final Office Action," issued in connection with U.S. Appl. No. 16/888,203, dated Jun. 17, 2022, 28 pages.

United States Patent and Trademark Office, "Non-Final Office Action," issued in connection with U.S. Appl. No. 16/888,203, dated Dec. 28, 2022, 23 pages.

United States Patent and Trademark Office, "Notice of Allowance," issued in connection with U.S. Appl. No. 16/888,203, dated Apr. 5, 2023, 9 pages.

International Searching Authority, Written Opinion, mailed in connection with International Patent Application No. PCT/US2021/034309, on Sep. 6, 2021, 3 pages.

International Searching Authority, "International Search Report," mailed in connection with International Patent Application No. PCT/US2021/034309, on Sep. 6, 2021, 3 pages.

The International Bureau of WIPO, "International Preliminary Report on Patentabilily," mailed in connection , with International Patent Application No. PCT/US2021/034309, on Dec. 8, 2022, 5 pages.

US 11,962,848 B2

METHODS AND APPARATUS TO IDENTIFY AN EPISODE NUMBER BASED ON FINGERPRINT AND MATCHED VIEWING INFORMATION

RELATED APPLICATION

This patent arises from a continuation of U.S. patent application Ser. No. 17/459,892, (now U.S. Pat. No. 11,363,332) which was filed on Aug. 27, 2021. U.S. patent application Ser. No. 17/459,892 is hereby incorporated herein by reference in its entirety. Priority to U.S. patent application Ser. No. 17/459,892 is hereby claimed.

FIELD OF THE DISCLOSURE

This disclosure relates generally to monitoring media and, more particularly, to methods and apparatus to identify an episode number based on fingerprint and matched viewing information.

BACKGROUND

On demand video streaming services have become prevalent in recent years. Video streaming services allow users to watch television shows at their leisure. Media monitoring companies seek to understand viewing patterns among users. Media monitoring companies can correctly identify known episodes of a television show.

BRIEF DESCRIPTION OF THE DRAWINGS

The figures are not to scale. In general, the same reference numbers will be used throughout the drawing(s) and accompanying written description to refer to the same or like parts.

Figure 1:
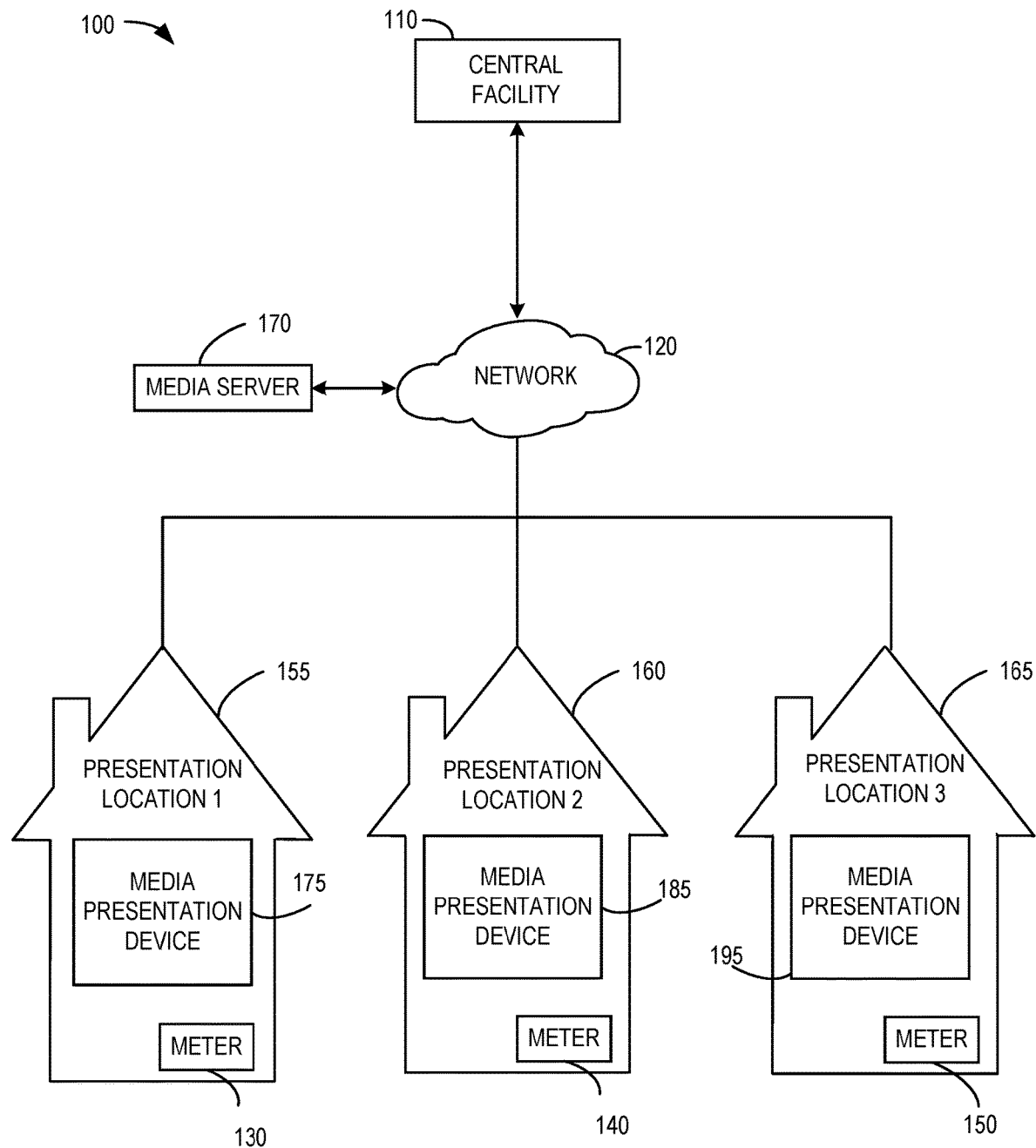
FIG. 1 is system diagram of an example media monitoring system having panelist locations including meters that communicate metering data to a central facility.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, streaming media is defined to include media data (such as audio and/or video data) transmitted from a media source over a data network to a media device for presentation such that a portion of the media data is presented (possibly after buffering at the media device) while a subsequent portion of the media data is being received (and possibly buffered at the media device). In some examples, the media source corresponds to Amazon Music, Amazon Video, CBS All Access, Disney+, Google Play Music, Hulu, You Tube, etc. (the media source may also be known as a content provider), the media device corresponds to, for example, a desktop computer, a laptop computer, a mobile computing device, a television, a smart phone, a mobile phone, an Apple® iPad®, an Apple® iPhone®, an Apple® iPod®, an Android™ powered computing device, a Palm® webOS® computing device, etc, and the data network corresponds to the Internet and/or a private network. In some examples, the media data is transmitted from the media source to the media device using one or more data transport streams established according to one or more existing and/or future network streaming communication protocols, such as Dynamic Adaptive Streaming over HTTP (DASH), HTTP live streaming (HLS), Real-time Transport Protocol (RTP), etc.

DETAILED DESCRIPTION

Most media programs (e.g., television shows, streaming video on demand series, etc.) in a series have identical and/or consistent introduction sections near the beginning of the program. Such introduction sections are where the program title is introduced, actors are credited, etc. In examples disclosed herein, such introductory section is referred to as a "bumper". During a bumper, there is usually a theme which is similar (possibly identical) for each episode of the series, especially for episodes in the same season. Theme music is sometimes slightly modified or changed completely across seasons. If there is reference data (e.g., information that would facilitate identification of the media program) for more than one episode of the series, then the bumper can be identified through fingerprint matching across episodes.

The identification of the bumper can be used to easily identify viewing of other episodes of a media program for which there is no reference data, aside from the bumper itself. If a bumper is identified, a subsequent portion of the media is likely a body of the media program. If multiple panelist locations have viewed a media program, then the meter data from those panelist locations will include fingerprints for program episodes. If there is sufficient agreement in matching across the homes and sites, then the episode fingerprints can be extracted from the matched meter data and labeled as a particular episode. The identification of the media program as being within a particular series, or season, in combination with presentation orders of the media across various presentation locations can be used to identify the media program as a particular episode.

In an episodic and/or sequential series, a story line from one episode leads into the storyline of a following episode. If the program series is a sequential series, which is often the case in newer television series, then it is likely that episodes will be viewed in order. This might not always be the case, since a viewer could go back and watch a previous episode, or different household members may be watching the series alone and at different paces. If, however, the media program is viewed in a similar sequential pattern across a threshold number of media presentation locations, the ordering of the media can be assumed to be sequential, resulting in an identification of the previously-unidentified media program.

FIG. 1 is system diagram of an example media monitoring system having presentation locations 155, 160, 165 including meters 130, 140, 150 that communicate metering data to a central facility via a network. The system 100 includes example meters 130, 140, 150, example presentation locations 155, 160, 165, example media server 170, example media presentation devices 175, 185, 195, example network 120, and example central facility 110. The meters can acquire viewing information data and communicate through a network 120. The viewing information data is sent via the network to a central facility 110 to be analyzed.

In the example illustrated in FIG. 1, the meters 130, 140, 150 are each positioned at presentation locations 155, 160, 165. A plurality of presentation locations can be located within a single household. The meter(s) 130, 140, 150 can be any type of meter that can extract a watermark and/or fingerprint data from audio signals. In some examples, the meter(s) can include a stationary metering device (e.g., such as Global Television Audience Metering (GTAM) meters, A/P meters, Nano meters, etc.) provided to meter panelists. In some examples, the meter(s) 130, 140, 150 process audio signals using an audio signal receiver, and evaluator, a data logger, and/or a data storage. In some examples, the meter(s) 130, 140, 150 can also include a memory, a wireless transceiver, and/or a power supply (e.g., rechargeable batteries). The meter(s) can identify a watermark and/or a fingerprint in the audio signals produced when a show is playing. Once the meter(s) retrieve a watermark and/or fingerprint from the audio signals, this data from the meter(s) can be communicated to a central facility via a network.

The media presentation device(s) 175, 185, 195 can be stationary or portable computers, televisions, handheld computing devices, smart phones, Internet appliances, and/or any other type of device that may be connected to a network (e.g., the Internet) and capable of presenting media. In the illustrated example of FIG. 1, the media presentation device(s) 175, 185, 195 can include a smartphone (e.g., an Apple® iPhone®, a Motorola™ Moto G™, a Nexus 7, an Android™ platform device, etc.), a laptop computer, a tablet (e.g., an Apple® iPad™, a Motorola™ Xoom™, etc.), a desktop computer, a camera, an Internet compatible television, a smart TV, etc. The meter(s) 130, 140, 150 may be standalone devices separate from the media presentation device(s), or alternatively, may be integrated into the media presentation device(s).

The example media server 170 provides media to one or more of the media presentation device(s) 175, 185, 195 for presentation at the media presentation location(s) 155, 160, 165. The media presentation device(s) 175, 185, 195 of FIG. 1 are used to execute a browser or another application (e.g., an app) to present the media retrieved from the example media server 170. Many different streaming video on demand service providers exist that provide various streaming video on demand services (e.g., Netflix, Disney+, Amazon Prime, Hulu). In providing each service, such streaming video on demand service providers may operate multiple media servers that provide media to the media presentation devices. In the example illustrated in FIG. 1, the media is provided to the media presentation device(s) 175, 185, 195 via the same network that the meter(s) 130, 140, 150 provide information to the central facility 110. In some examples, the meter(s) 130, 140, 150 can communicate via a separate network such as when the meter(s) 130, 140, 150 communicate data over a cellular network while the media presentation device(s) 175, 185, 195 get their media via a broadband connection.

The network 120 may be implemented using any suitable wired and/or wireless network(s) including, for example, the Internet, one or more data buses, one or more Local Area Networks (LANs), one or more wireless LANs, one or more cellular networks, etc. As used herein, the phrase "in communication," including variations thereof, encompasses direct communication and/or indirect communication through one ore more intermediary components and does not require direct physical (e.g., wired) communication and/or constant communication, but rather additionally includes selective communication at periodic or aperiodic intervals, as well as one-time events.

The central facility 110 processes and analyzes data from the meter(s) 130, 140, 150. The central facility 110 obtains metered data from multiple meters or presentation locations and chronologically analyzes the metering data. The central facility 110 attempts to identify a bumper within the metering data and then identifies sequential patterns in media presentations. The central facility 110 determines if a threshold number of sequential patterns are identified and labels unidentifiable media as a particular episode within a series. The central facility 110 also generates media reports for viewing information about previously unidentifiable episodes.

Figure 2:
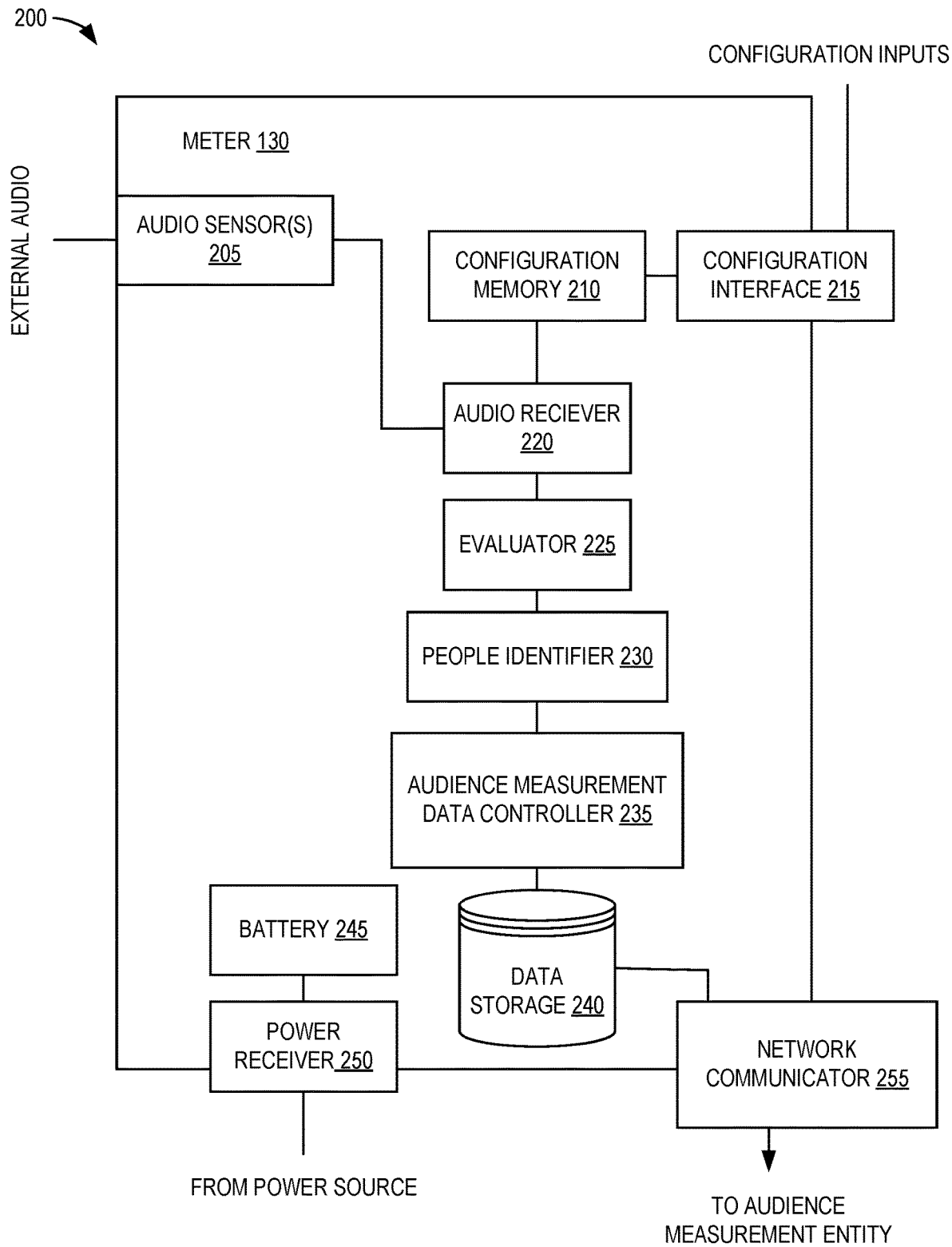
FIG. 2 is block diagram of an example implementation of the meter of FIG. 1.

FIG. 2 is block diagram of an example implementation of the meter 130 of FIG. 1. The meter 130 includes example audio sensor(s) 205, an example audio receiver 220, an example evaluator 225, an example people identifier 230, an example audience measurement data controller 235, and an example data storage 240. The meter 130 also includes an example configuration memory 210, an example configuration interface 215, an example power receiver 250, an example battery 245, and an example network communicator 255.

The audio sensor(s) 205 can be used to monitor audio output from a viewing device such as a smartphone (e.g., an Apple® iPhone®, a Motorola™ Moto G™, a Nexus 7, an Android™ platform device, etc.), a laptop computer, a tablet (e.g., an Apple® iPad™, a Motorola™ Xoom™, etc.), a desktop computer, a camera, an Internet compatible television, a smart TV, etc. The audio sensor(s) 205 can be implemented by microphone(s) and/or any other type of acoustic sensor(s).

The audio receiver 220 receives audio from the audio sensor(s) 205. In some examples, the audio receiver 220 identifies a specific pattern of the fingerprint and/or watermark received from the audio sensor 205. In some examples, the audio receiver 220 receives an audio signal that is specific to database of watermarks and/or fingerprints accessible to the meter 130.

The evaluator 225 evaluates the data received by the audio receiver 220. In some examples, the evaluator 225 compares identified watermark(s) and/or fingerprint(s) against a database accessible to the meter 130 (e.g., data storage 240). For example, the television show can be identified by the evaluator 225 by a specific fingerprint or watermark pattern. In some examples, the fingerprint and/or watermark pattern can correspond to for a bumper for a television show that have been configured into the meter 130.

The people identifier 230 logs data received by the meter 130 to identify an audience member. Different panelists at a single presentation location may view the same show at different paces. It may be useful to keep track of each panelist's viewing data. In some examples, the people identifier 230 can be used to keep track of users (e.g., panelists) who enter and/or exit a given room of the household to include the panelist(s) as audience members when viewing device(s) are turned on and/or presenting media. In some examples, the people identifier 230 adds the user to an audience list or removes the user from the audience list based on a user request.

The audience measurement data controller 235 can receive media identifying information from the evaluator 225 and or audience identification data from the people identifier 230. In some examples, the audience measurement data controller 235 stores the information received from the evaluator 225 and/or the people identifier 230 in the data storage 240. In some examples, the audience measurement data controller 235 can periodically and/or a-periodically transmit, via the network communicator 255, the audience measurement information stored in the data storage 240. For example, the audience measurement data controller 235 can transmit the collected data to the central facility 110 for aggregation and/or preparation of media monitoring reports.

The data storage 240 stores any data associated with the audio receiver 220, evaluator 225, and/or the people identifier 230. The data storage 240 can be a cloud-based storage (e.g., storage on the network 112). In some examples, the data storage 240 may be implemented by any storage device and/or storage disc for storing data such as, for example, flash memory, magnetic media, optical media, etc. Furthermore, the data stored in the data storage 240 may be in any data format such as, for example, binary data, comma delimited data, tab delimited data, structured query language (SQL) structures, etc. While in the illustrated example the data storage 240 is illustrated as a single database, the data storage 240 can be implemented by any number and/or type(s) of databases.

The configuration memory 210 can be used to store an audio sensor configuration identifying which of the audio sensor(s) 205 can be used to form an audio signal to be processed by the audio receiver 220. However, any other configurational and/or operational information can be additionally or alternatively stored. In some examples, the configuration memory 210 can be updated using the configuration interface 215. The configuration memory 210 can be implemented by any device for storing data (e.g., flash memory, magnetic media, optical media, etc.). Data stored in the configuration memory 210 can be in any data format (e.g., binary data, comma delimited data, tab delimitated data, etc.).

The configuration interface 215 can receive configuration inputs from a user and/or an installer of the meter 130. In some examples, the configuration interface 215 allows the user and/or installer to indicate audio sensor configuration to be stored in the configuration memory 210. In some examples, the configuration interface 215 allows the user and/or installer to control operational parameters of the meter 130 (e.g., Internet-based credentials to be used by the network communication 255, setting of a household and/or panelist identifier, etc.). The configuration interface 215 can be implemented using a Bluetooth Low Energy radio, an infrared input, a universal serial (USB) connection, a serial connection, an Ethernet connection, etc. In some examples, the configuration interface 215 can be used to communicatively couple the meter 130 to a media device (e.g., the media presentation device) being used in the media presentation environment.

The power receiver 250 can be used to connect the meter 130 to a power source. For example, the power receiver 250 can be implemented as a universal serial bus (USB) receptacle to enable the meter 130 to be connected to a power source via a cable (e.g., a USB cable). In some examples, a media presentation device (e.g., used in the media presentation environment being monitored by the meter 130) includes a port (e.g., a USB port, a High Definition Media Interface (HDMI) port, an Ethernet port, etc.) that provides electrical power to an external device such as the meter 130. The power receiver 250 can be implemented in any fashion to facilitate receipt of electrical power from a media presentation device and/or any other power source (e.g., a wall outlet, etc.). In some examples, the battery 245 can be used to store power for use by the meter 130 to enable the operation of the meter 130 when power is not being supplied via the power receiver 250. In some examples, the battery 245 can be a lithium-ion battery. However, any other type of battery may additionally or alternatively be used. In some examples, the battery 245 can be rechargeable, such that the battery 245 can recharge while the power receiver 250 provides power to the AME meter 130.

The network communicator 255 can transmit audience measurement information provided by the audience measurement data controller 235 (e.g., data stored in the data storage 240) to the central facility 110 of the audience measurement entity. In some examples, the network communicator 255 can be implemented using a WiFi antenna that communicated with a WiFi network hosted by a gateway. However, the network communicator 255 may additionally or alternatively be implemented by an Ethernet port that communicates via an Ethernet network (e.g., a local area network (LAN)). In some examples, the network communicator 255 can be implemented by a cellular radio.

While an example manner of implementing the example meter 130 is illustrated in FIG. 2, one or more of the elements, processes, and/or devices illustrated in FIG. 2 may be combined, divided, rearranged, omitted, eliminated, and/or implemented in any other way. Further, the example audio sensor(s) 205, the example audio receiver 220, the example evaluator 225, the example people identifier 230, the example audience measurement data controller 235, the example power receiver 250, the example network communicator 255, and/or, more generally, the example meter 130 of FIG. 2 may be implemented by hardware, software, firmware and/or any combination of hardware, software and/or firmware. Thus, for example, either of the example audio sensor(s) 205, the example audio receiver 220, the example evaluator 225, the example people identifier 230, the example audience measurement data controller 235, the example power receiver 250, and/or the example network communicator 255 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio sensor(s) 205, the example audio receiver 220, example evaluator 225, the example people identifier 230, the example audience measurement data controller 235, the example power receiver 250, and/or the example network communicator 255 is/are hereby expressly defined to include a tangible computer-readable storage device or storage disk, such as a memory storage device, a digital versatile disk (DVD), a compact disk (CD), a Blu-ray disk, etc. storing the software and/or firmware. Further still, the example audio sensor(s) 205, the example audio receiver 220, example evaluator 225, the example people identifier 230, the example audience measurement data controller 235, the example power receiver 250, and/or the example network communicator 255 of FIG. 2 may include one or more elements, processes, and/or devices in addition to, or instead of, those illustrated/described in connection with FIG. 2, and/or may include more than one of any or all of the illustrated/described elements, processes, and devices.

Figure 3:
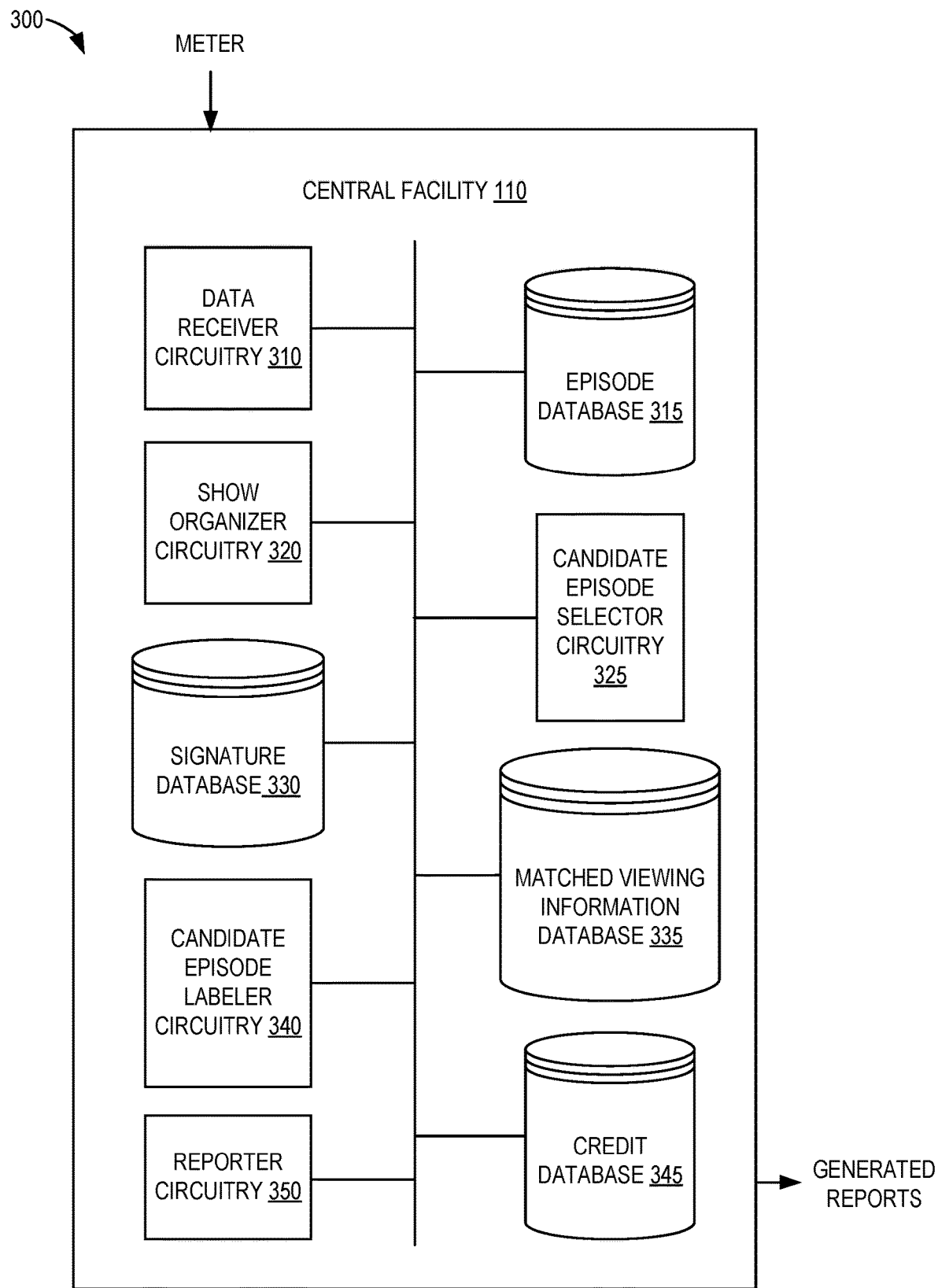
FIG. 3 is a block diagram of an example implementation of the central facility of FIG. 1.

FIG. 3 is a block diagram of an example implementation of the central facility 110 of FIG. 1. In the example of FIG. 3, the central facility 110 includes example data receiver circuitry 310, example episode database 315, example show organizer circuitry 320, example candidate episode selector circuitry 325, an example signature database 330, an example matched viewing information database 335, example candidate episode labeler circuitry 340, an example credit database 345, and reporter circuitry 350.

The example data receiver circuitry 310 of the illustrated example of FIG. 3 receives viewing data from the meter(s), 130, 140, 150. In some examples, the data receiver circuitry 310 sends the viewing data to the example episode database 315 for storage.

The example episode database 315 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example episode database 315 may be in any data format such as, for example, binary data, comma delimited data, tab delimited data, structured query language (SQL) structures, etc. While, in the illustrated example, the episode database 315 is illustrated as a single device, the example episode database 315 and/or any other data storage devices described herein may be implemented by any number and/or type(s) of memories. In the illustrated example of FIG. 3, the example episode database 315 stores known and unknown episode viewing data associated with the example data receiver circuitry 310.

The example show organizer circuitry 320 of the illustrated example of FIG. 3 retrieves viewing data from the episode database 315, and organizes the received data into chronologically watched media for each presentation location for a given show including known and unknown episodes. In some examples, received data is identified as a particular show by the show organizer circuitry 320 by matching bumper content from the episode database 315 with known bumper content from the example signature database 330 for a particular show. In examples disclosed herein, the show organizer circuitry 320 performs matching by identifying whether a threshold level of similarity exists between two items to be compared (e.g., two bumpers). The show organizer circuitry 320 stores the organized viewing data in the matched viewing information database 335.

The example candidate episode selector circuitry 325 of the illustrated example of FIG. 3 selects candidate episodes for identification. In examples disclosed herein, the candidate episode selector circuitry 325 starts at the first known chronological episode and continue chronologically through known and unknown episodes until, for example, any unknown episodes have been identified.

The example signature database 330 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example signature database 330 may be in any data format such as, for example, binary data, comma delimited data, tab delimited data, structured query language (SQL) structures, etc. While, in the illustrated example, the signature database 330 is illustrated as a single device, the example signature database 330 and/or any other data storage devices described herein may be implemented by any number and/or type(s) of memories. In the illustrated example of FIG. 3, the example signature database 330 stores known episode signatures.

The example matched viewing information database 335 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example matched viewing information database 335 may be in any data format such as, for example, binary data, comma delimited data, tab delimited data, structured query language (SQL) structures, etc. While, in the illustrated example, the matched viewing information database 335 is illustrated as a single device, the example matched viewing information database 335 and/or any other data storage devices described herein may be implemented by any number and/or type(s) of memories. In the illustrated example of FIG. 3, the example matched viewing information database 335 stores the number of presentation locations that viewed a particular potential episode. The matched viewing information database 335 stores information associated with the show organizer circuitry 320. In some examples, the matched viewing information database 335 stores the number of presentation locations that viewed a particular unknown episode after a known episode. The matched viewing information database 335 may store whether each episode is creditable or not creditable The example candidate episode labeler circuitry 340 of the illustrated example of FIG. 3 determines whether the candidate episode is presented sequentially after a known episode in a threshold number of presentation locations. The candidate episode labeler circuitry 340 will label a candidate episode as the next sequential episode after a known episode if a threshold percentage of presentation locations have watched the candidate episode after the known episode.

The example credit database 345 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example credit database 345 may be in any data format such as, for example, binary data, comma delimited data, tab delimited data, structured query language (SQL) structures, etc. While, in the illustrated example, the credit database 345 is illustrated as a single device, the example credit database 345 and/or any other data storage devices described herein may be implemented by any number and/or type(s) of memories. In the illustrated example of FIG. 3, the example credit database 345 stores known and creditable episodes with episode number and show title. In some examples, a candidate episode's credibility status is identified by if the candidate episode is in the credit database 345. As unknown media is identified, it is credited, and the credit information is stored in the credit database 345.

The example reporter circuitry 350 of the illustrated example of FIG. 3 generates a media report. For example, the generated media report can include, but is not limited to, number of viewers, demographic breakdown of viewers, and/or geographic breakdown of viewers for each episode in a series. As a result of the processes used in this disclosure, previously unidentified media programs (e.g., newly released episodes) can be more readily identified and included in media presentation reports. As a result, such media reports are more timely, and have greater value to advertisers as opposed to a media report that is delayed due to newly aired episodes being unidentifiable for a period of time (e.g., perhaps until a newly aired episode is manually identified).

In some examples, the central facility 110 includes means for accessing meter data. For example, the means for accessing may be implemented by data receiver circuitry 310. In some examples, the data receiver circuitry 310 may be implemented by machine executable instructions such as that implemented by at least block 505 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the data receiver circuitry 310 is implemented by other hardware logic circuitry, hardware implemented state machines, and/or any other combination of hardware, software, and/or firmware. For example, the data receiver circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 110 includes means for processing the meter data to identify a presented show based on a bumper included in a show. For example, the means for processing may be implemented by show organizer circuitry 320. In some examples, the show organizer circuitry 320 may be implemented by machine executable instructions such as that implemented by at least block 510 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the show organizer circuitry 320 is implemented by other hardware logic circuitry, hardware implemented state machines, and/or any other combination of hardware, software, and/or firmware. For example, the show organizer circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 110 includes means for filtering the meter data based on the identification of the show. For example, the means for filtering may be implemented by show organizer circuitry 320. In some examples, the show organizer circuitry 320 may be implemented by machine executable instructions such as that implemented by at least block 510, 515 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the show organizer circuitry 320 is implemented by other hardware logic circuitry, hardware implemented state machines, and/or any other combination of hardware, software, and/or firmware. For example, the show organizer circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for filtering includes means for means for chronologically organizing the filtered meter data. For example, the means for organizing may be implemented by show organizer circuitry 320. In some examples, the show organizer circuitry 320 may be implemented by machine executable instructions such as that implemented by at least block 510, 515 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the show organizer circuitry 320 is implemented by other hardware logic circuitry, hardware implemented state machines, and/or any other combination of hardware, software, and/or firmware. For example, the show organizer circuitry 320 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 110 includes means for selecting a candidate episode. For example, the means for selecting may be implemented by candidate episode selector circuitry 325. In some examples, the candidate episode selector circuitry 325 may be implemented by machine executable instructions such as that implemented by at least blocks 520, 525 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the candidate episode selector circuitry 325 is implemented by other hardware logic circuitry, hardware implemented state machines, and/or any other combination of hardware, software, and/or firmware. For example, the candidate episode selector circuitry 325 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 110 includes means for determining. For example, the means for determining may be implemented by candidate episode labeler circuitry 340. In some examples, the candidate episode labeler circuitry 340 may be implemented by machine executable instructions such as that implemented by at least blocks 525, 530 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the candidate episode labeler circuitry 340 is implemented by other hardware logic circuitry, hardware implemented state machines, and/or any other combination of hardware, software, and/or firmware. For example, the candidate episode labeler circuitry 340 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 110 includes means for labeling. For example, the means for labeling may be implemented by candidate episode labeler circuitry 340. In some examples, the candidate episode labeler circuitry 340 may be implemented by machine executable instructions such as that implemented by at least blocks 535, 540 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the candidate episode labeler circuitry 340 is implemented by other hardware logic circuitry, hardware implemented state machines, and/or any other combination of hardware, software, and/or firmware. For example, the candidate episode labeler circuitry 340 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the central facility 110 of FIG. 1 are illustrated in FIG. 3, one or more of the elements, processes, and/or devices illustrated in FIG. 3 may be combined, divided, re-arranged, omitted, eliminated, and/or implemented in any other way. Further, the example data receiver circuitry 310, the example show organizer circuitry 320, the example candidate episode selector circuitry 325, the example candidate episode labeler circuitry 340, the example reporter circuitry 350, and/or, more generally, the example central facility 110 of FIG. 3, may be implemented by hardware, software, firmware, and/or any combination of hardware, software, and/or firmware. Thus, for example, any of the example data receiver circuitry 310, the example show organizer circuitry 320, the example candidate episode selector circuitry 325, the example candidate episode labeler circuitry 340, the example reporter circuitry 350, and/or, more generally, the example central facility 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data receiver circuitry 310, the example show organizer circuitry 320, the example candidate episode selector circuitry 325, the example candidate episode labeler circuitry 340, and/or the example reporter circuitry 350 is/are hereby expressly defined to include a non-transitory computer readable storage device or storage disk such as a memory, a digital versatile disk (DVD), a compact disk (CD), a Blu-ray disk, etc., including the software and/or firmware. Further still, the example central facility 110 of FIG. 3 may include one or more elements, processes, and/or devices in addition to, or instead of, those illustrated in FIG. 10, and/or may include more than one of any or all of the illustrated elements, processes and devices.

Figure 4:
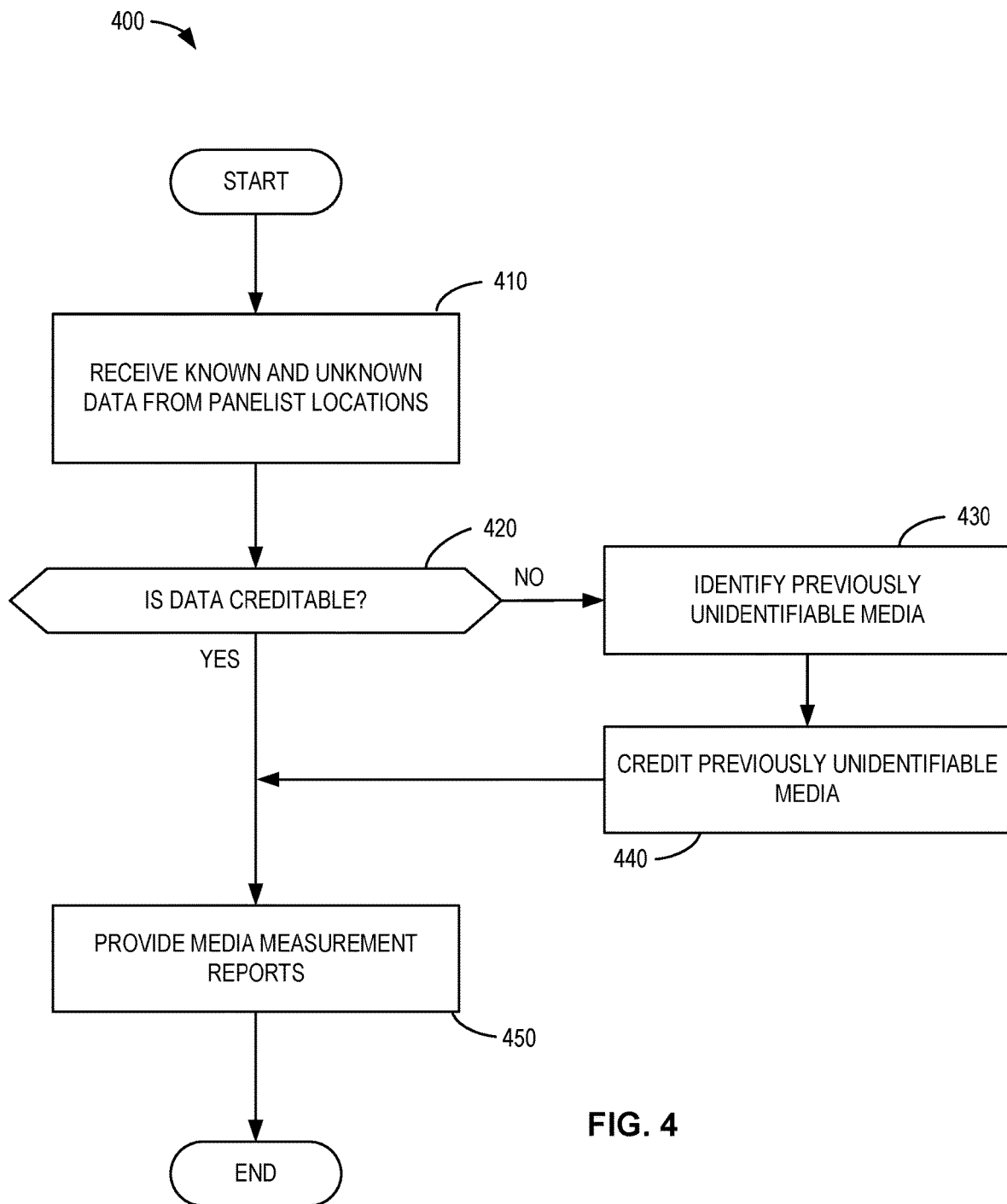
FIG. 4 is a flowchart representative of example machine readable instructions that may be executed by example processor circuitry to implement the example central facility of FIGS. 1 and/or 3 to identify and credit previously unidentifiable media.

Flowcharts representative of example hardware logic circuitry, machine readable instructions, hardware implemented state machines, and/or any combination thereof for implementing the central facility 110 of FIGS. 1 and/or 3 are shown in FIGS. 4 and/or 5. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4 and/or 5, many other methods of implementing the example central facility 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to identify and credit previously unidentifiable media. The machine readable instructions and/or operations 400 of FIG. 4 begin when the data receiver circuitry 310 receives known and unknown monitoring data describing presented media from panelist locations (block 410).

The candidate episode selector circuitry 325 determines whether any unidentifiable episodes are present in the received meter data (block 420). In some examples, a candidate episode's fingerprint is cross matched with the episodes in the credit database 345 to determine if the episode is in the credit database 345. If there is any unidentifiable media in the viewing data, the candidate episode labeler circuitry 340 will identify the previously unidentifiable media (block 430) and credit the previously unidentifiable media (block 440). The credited media information is stored in the credit database 345. If there are no unidentifiable episodes, the reporter circuitry will provide media measurement reports (block 450).

Figure 5:
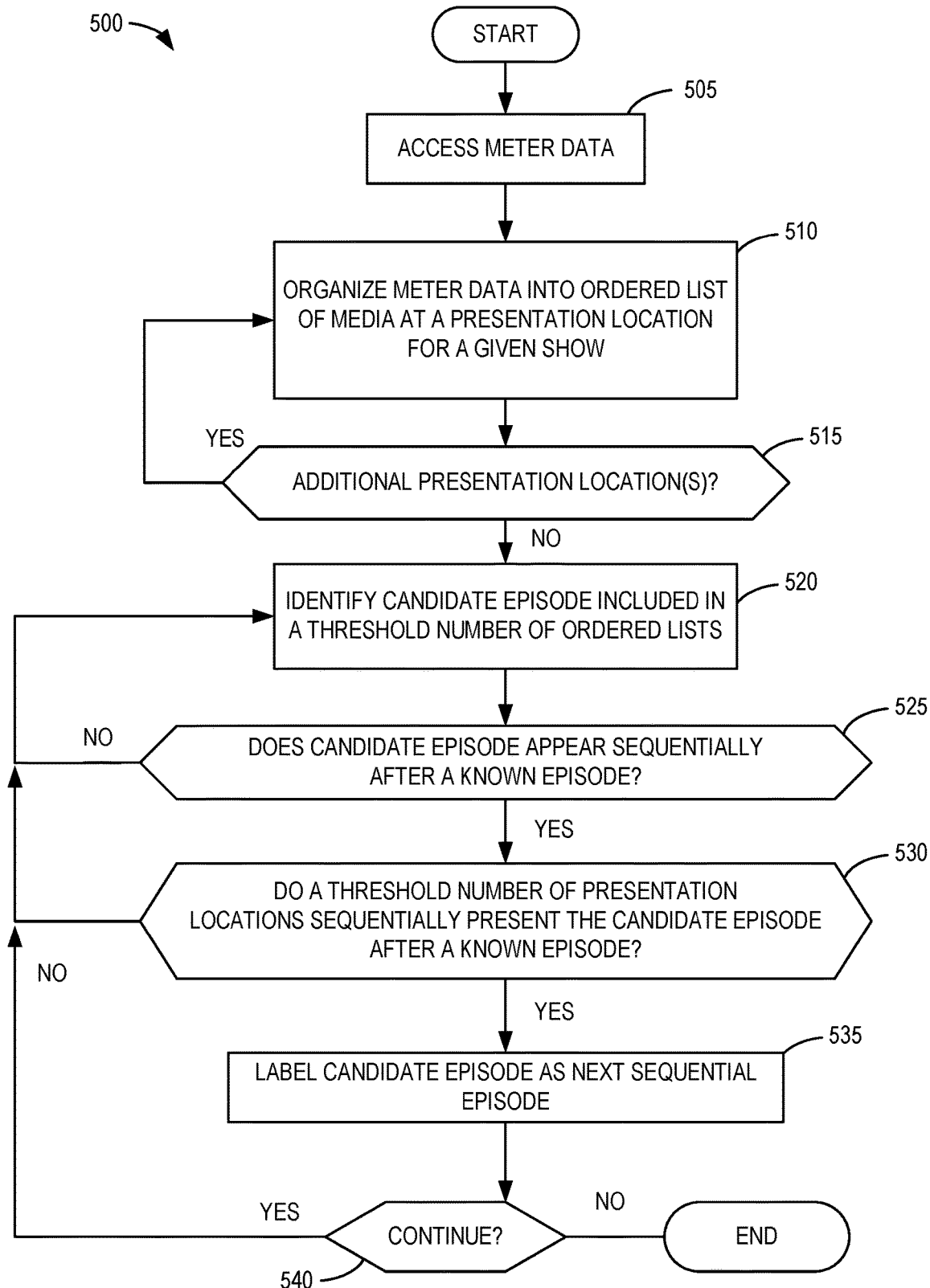
FIG. 5 is a flowchart representative of example machine readable instructions that may be executed by example processor circuitry to implement the example candidate episode labeler of FIGS. 1 and/or 3 to label a candidate episode.
Figure 6:
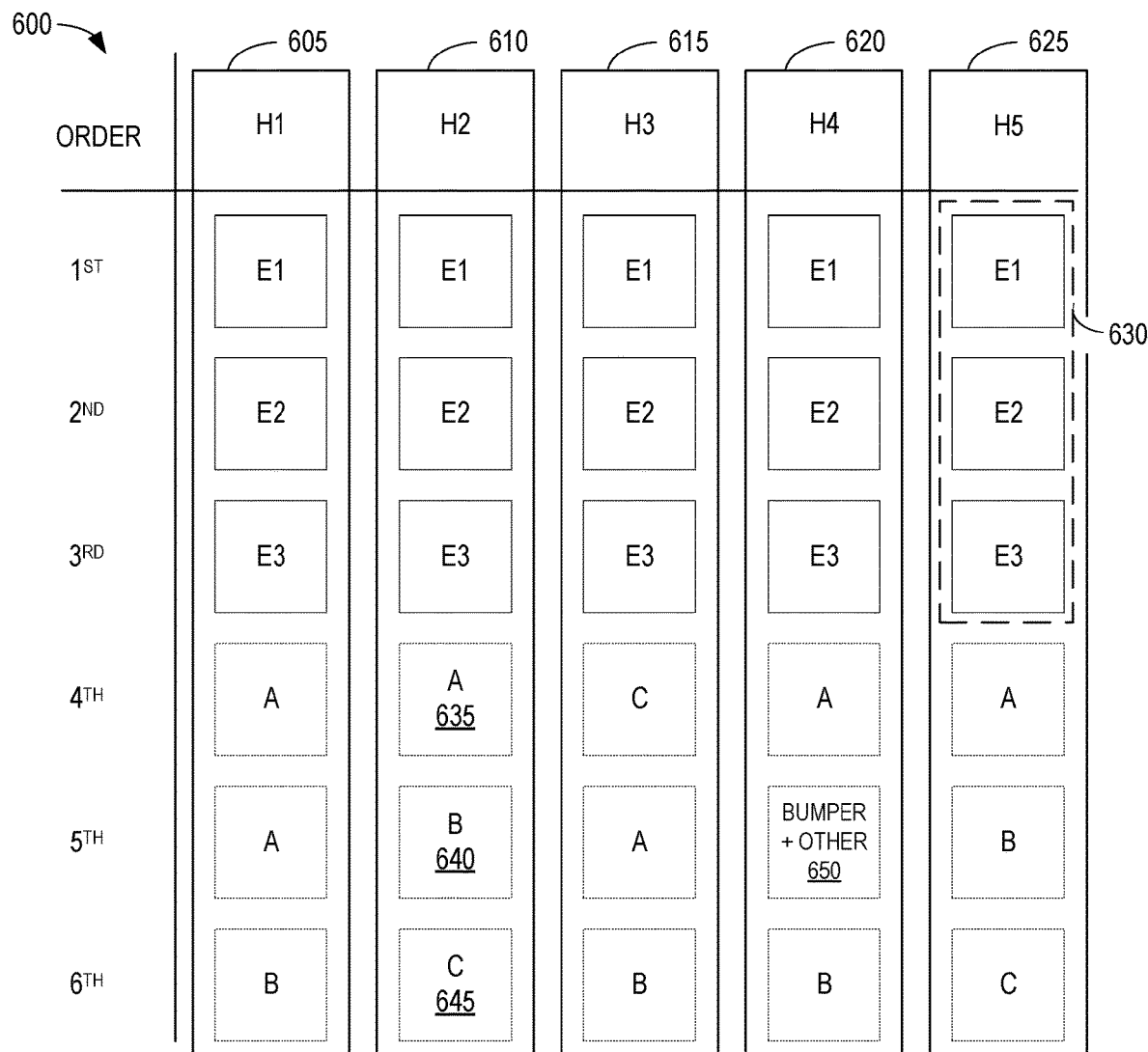
FIGS. 6, 7, 8, and/or 9 are example data tables illustrating a progression of episode identifications according to the example flowchart of FIG. 5.
Figure 7:
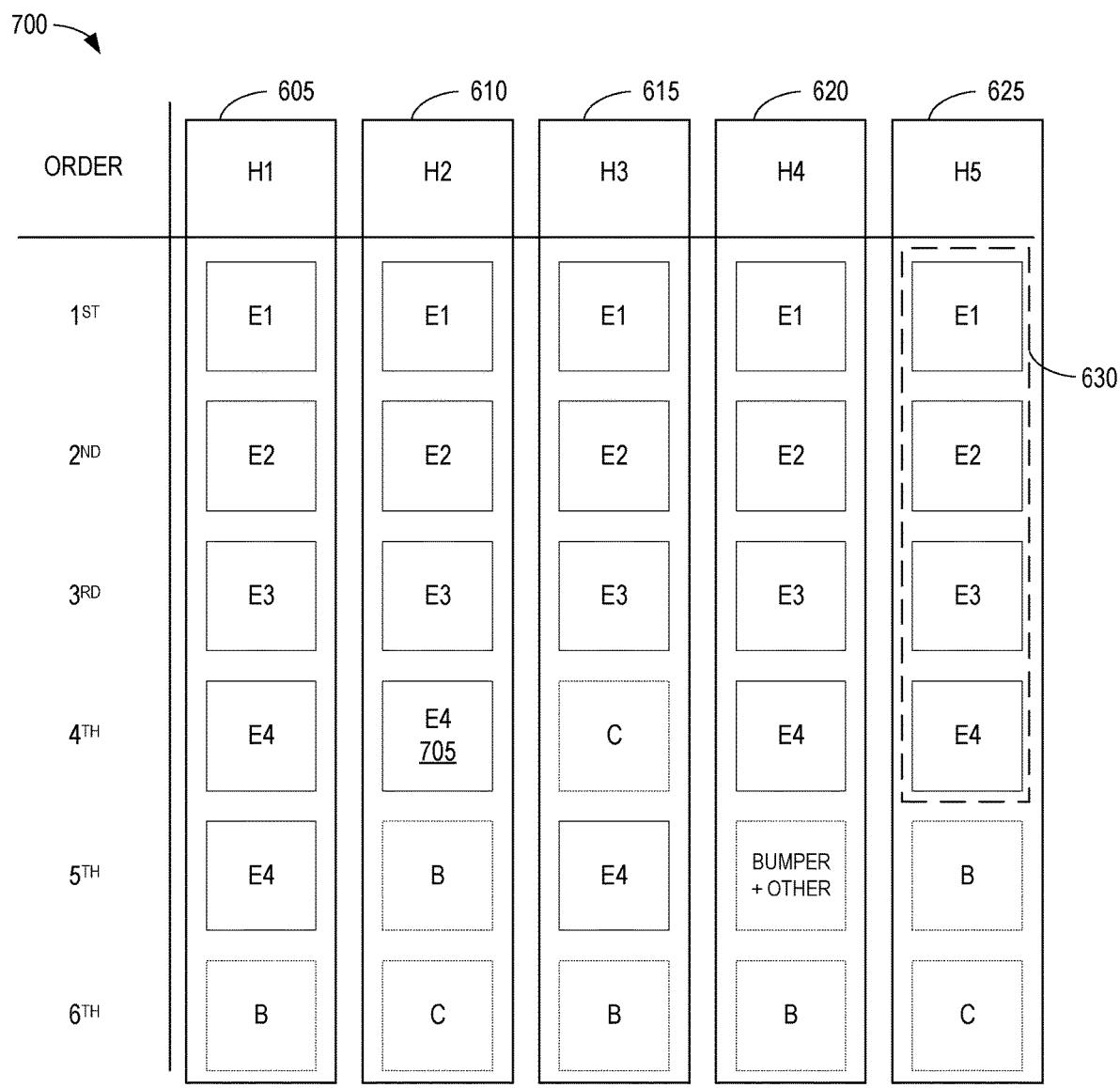
Figure 8:
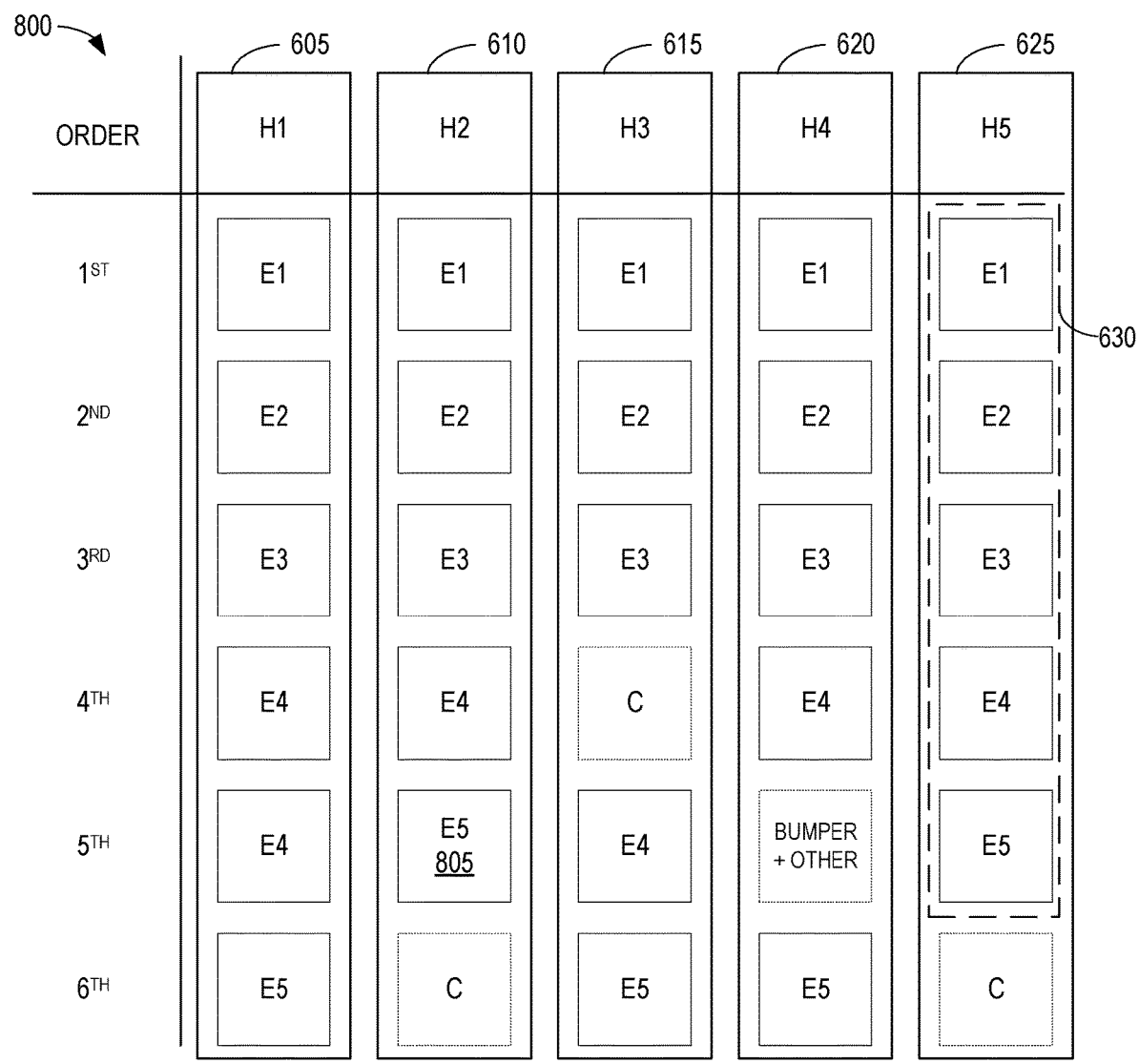

FIG. 5 is a flowchart representative of example machine readable instructions and/or example operations 500 that may be executed and/or instantiated by processor circuitry to label a candidate episode. The machine readable instructions and/or operations 500 of FIG. 5 begin when the data receiver circuitry 310 accesses data from the meter(s) 130, 140, 150 of FIGS. 1 and/or 2 (block 505). FIGS. 6, 7, 8, and/or 9 are example data tables illustrating a progression of episode identifications according to the example flowchart of FIG. 5.

In the example of FIG. 5, the show organizer circuitry 320 organizes the meter data into a chronological list of media at a presentation location for a given show including known and unknown episodes (block 510). The matched viewing information database 335 stores information received from the show organizer circuitry 320. In some examples, the matched viewing information database 335 stores the number of presentation locations that viewed a particular unknown episode after a known episode. The show organizer circuitry 320 organizes received data into chronologically watched media for each presentation location (block 515).

FIGS. 6, 7, 8, and/or 9 are example data tables 600, 700, 800, and 900 illustrating a progression of episode identifications according to the example flowchart of FIG. 5. In the example data table 600 shown in FIG. 6, five presentation locations 605, 610, 615, 620, and 625 are shown. In each presentation location there are known episodes 630 and three potential episodes for which the bumper for a particular show has been detected in chronological presentation order. The second presentation location includes potential episode A 635, potential episode B 640, and potential episode C 645. Signatures that match these potential episodes are present in multiple other presentation locations. In the fourth presentation location 620, the second potential episode 650 has a signature that is not present in any other presentation location, though the shows bumper is presented.

Returning to FIG. 5, the candidate episode selector circuitry 325 selects an unknown episode to label, the unknown episode is referred to as the candidate episode (block 520). In examples disclosed herein, the candidate episode selector circuitry 325 starts at the first known chronological episode and continues chronologically through known and unknown episodes until all potential episodes have been credited. In examples disclosed herein, the candidate episode appears in a metering data representing at least a threshold number of presentation locations. For example, potential episode A 635 can be chosen as the first candidate episode (block 520). In the example showed in FIGS. 6, 7, 8 and/or 9, this threshold is two presentation locations.

Figure 9:
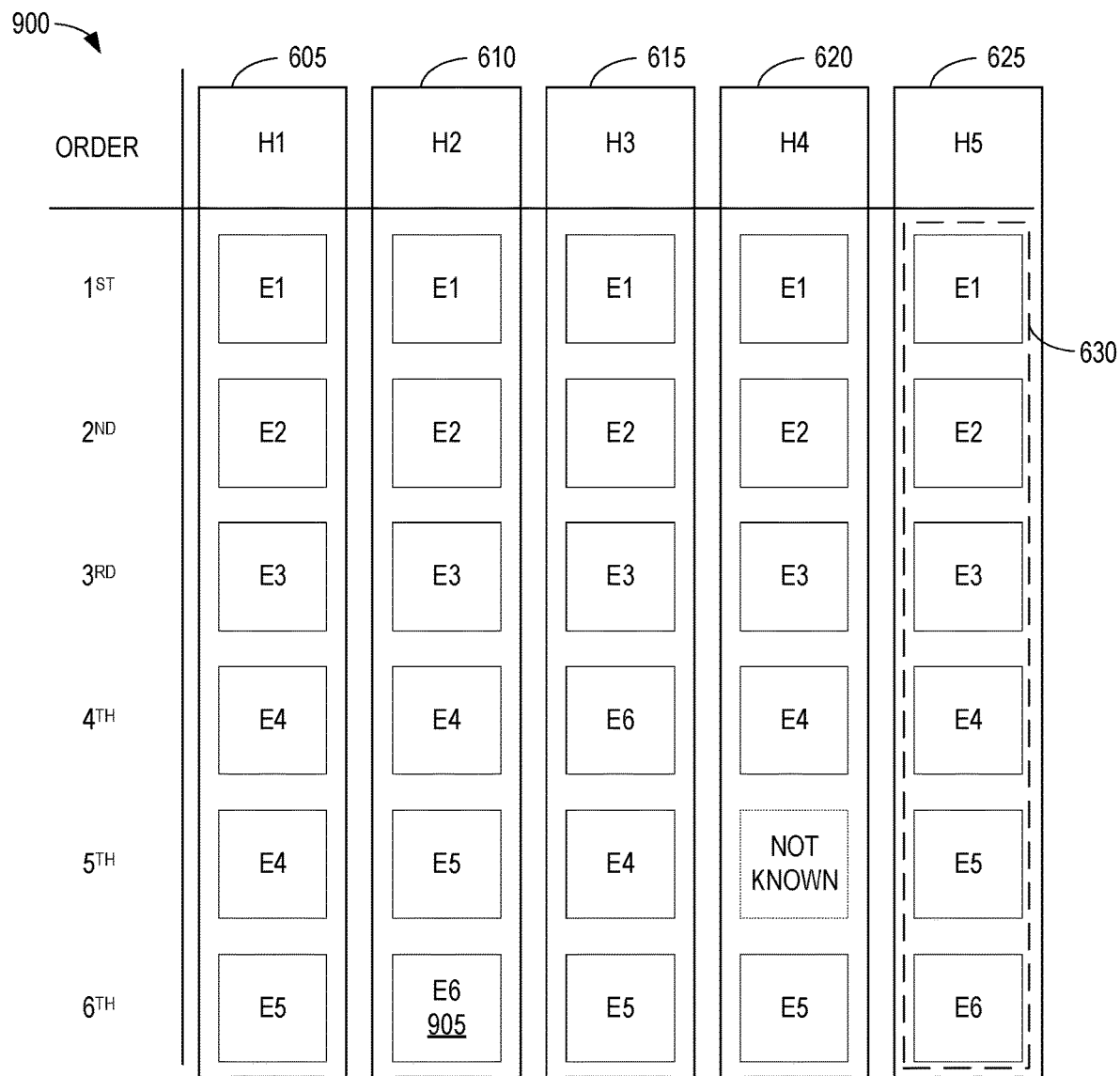

The candidate episode labeler circuitry 340 determines whether the candidate episode appears sequentially after a known episode from data stored in the matched viewing information database (block 525). In this example, potential episode A 635 is presented after the known episode 3 in the second household (block 525). If the candidate episode does not appear after a known episode in any of the presentation locations, the candidate episode selector circuitry 325 will select a new candidate episode (block 520). As shown in FIG. 6, in the fourth presentation location 620, the second potential episode 650 has a signature that is not present in any other presentation location, though the show's bumper is presented. In this example, the viewer began to watch an episode of this particular show but stopped after the bumper and started an episode of another show. When the candidate episode selector circuitry 325 tries to select this potential episode 650 as a candidate episode, it will find that this signature did not appear at multiple other presentation locations and move on to another episode (block 520). This signature is not added to any database and is considered not known as can be seen in FIG. 9.

If the candidate episode appears sequentially after a known episode, the candidate episode labeler circuitry 340 determines if a threshold number of presentation locations sequentially present the candidate episode after a known episode (block 530). For example, in FIG. 6, potential episode A 635 is presented six times across all presentation locations and four out of six presentations (66%) occur sequentially after the known episode 3 (block 530). In this example, the threshold number of presentation locations is three media presentation locations and, as a result, candidate episode A can be labeled as episode 4. While in the illustrated example of FIG. 5, the threshold is represented as a number of media presentation locations, any other type of threshold may additionally or alternatively be used including, for example, whether a threshold percentage of reporting media presentation locations sequentially showed the candidate episode after a particular known episode. If the threshold number of presentation locations is not met, control proceeds to block 520, where the candidate episode selector circuitry 325 selects a new candidate episode for evaluation.

If the threshold is met (e.g., block 530 returns a result of YES), the candidate episode labeler circuitry 340 labels the candidate episode as the next sequential episode after the known episode (block 535). As a result, the candidate episode becomes a known episode in the signature database 330, the matched viewing information database 335, and the credit database 345. As shown in FIG. 7, potential episode A 635 can be labelled as the known episode 4 (705) (block 535).

If there are more potential episodes after the candidate episode has been labelled, the candidate episode labeler circuitry will select a new candidate episode (block 540). Continuing the example of FIGS. 6 and 7, in FIG. 8, there are still unlabeled potential episodes. As shown in FIG. 8, potential episode B 640 is now labeled as known episode 5 805, because at least the threshold number of media presentation locations sequentially present the candidate episode after a known episode (e.g., episode 4). Continuing this example into FIG. 9, candidate episode C 645 is labeled as known episode 6 (905), because at least the threshold number of media presentation locations sequentially present the candidate episode after a known episode (e.g., episode In FIG. 9, all but one of the media presentations are identified as a result of the approaches disclosed herein.

Figure 10:
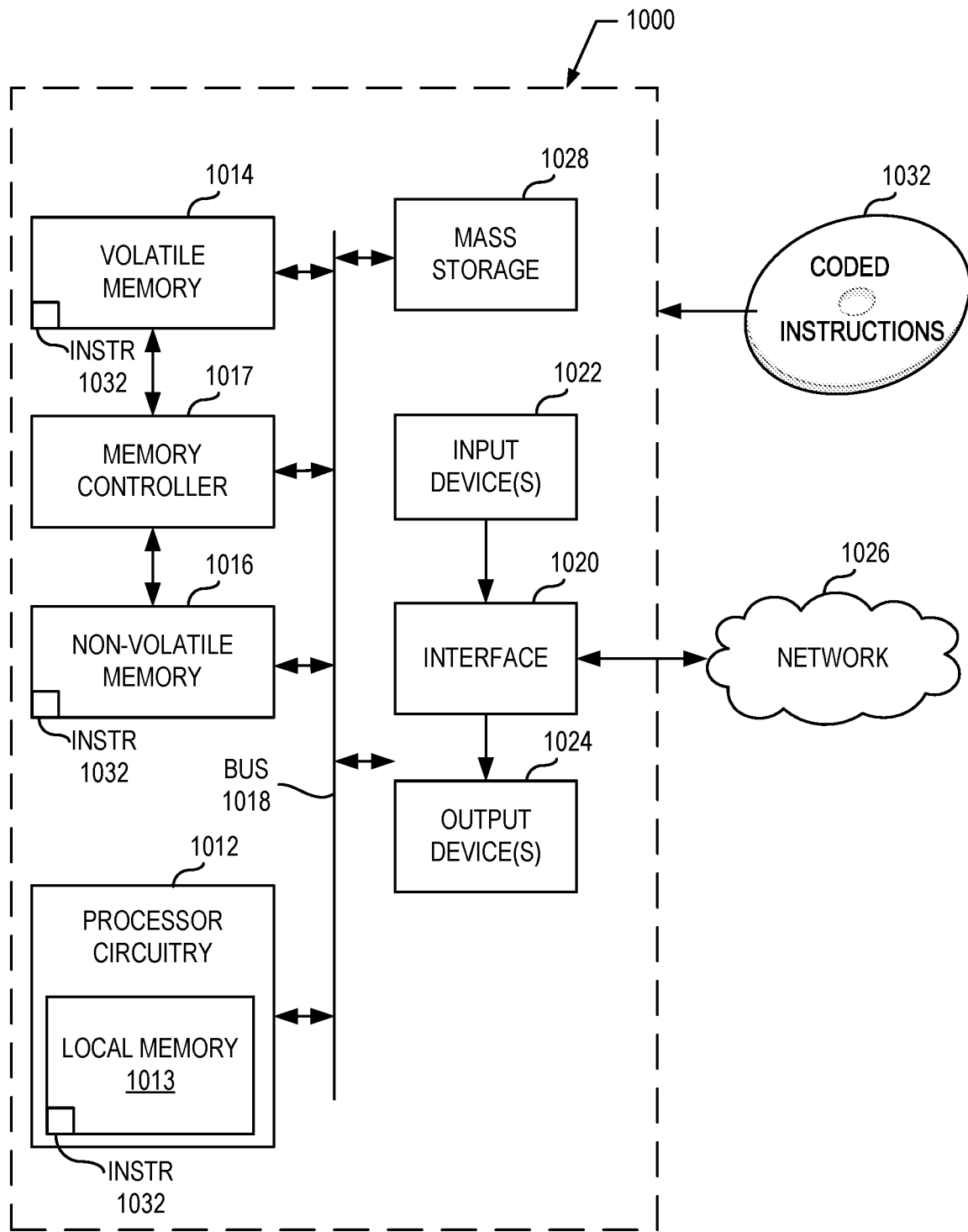
FIG. 10 is a block diagram of an example processing platform including processor circuitry structured to execute the example machine readable instructions of FIGS. 4 and/or 5 to implement the example central facility of FIGS. 1 and/or 3.

FIG. 10 is a block diagram of an example processor platform 1000 structured to execute and/or instantiate the machine readable instructions and/or operations of FIGS. 4 and/or 5 to implement the central facility 110 of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs micropro-cessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example data receiver circuitry 310, the example show organizer circuitry 315, the example candidate episode selector circuitry 320, the example candidate episode labeler circuitry 335, and reporter circuitry 350.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In this example, the main memory 104, 1016 contains the example signature database 325, the example matched viewing information database, and the example credit database 340.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 4 and/or 5, may be stored in the mass storage device 1028, in the volatile memory 1014, in the non-volatile memory 1016, and/or on a removable non-transitory computer readable storage medium such as a CD or DVD.

Figure 11:
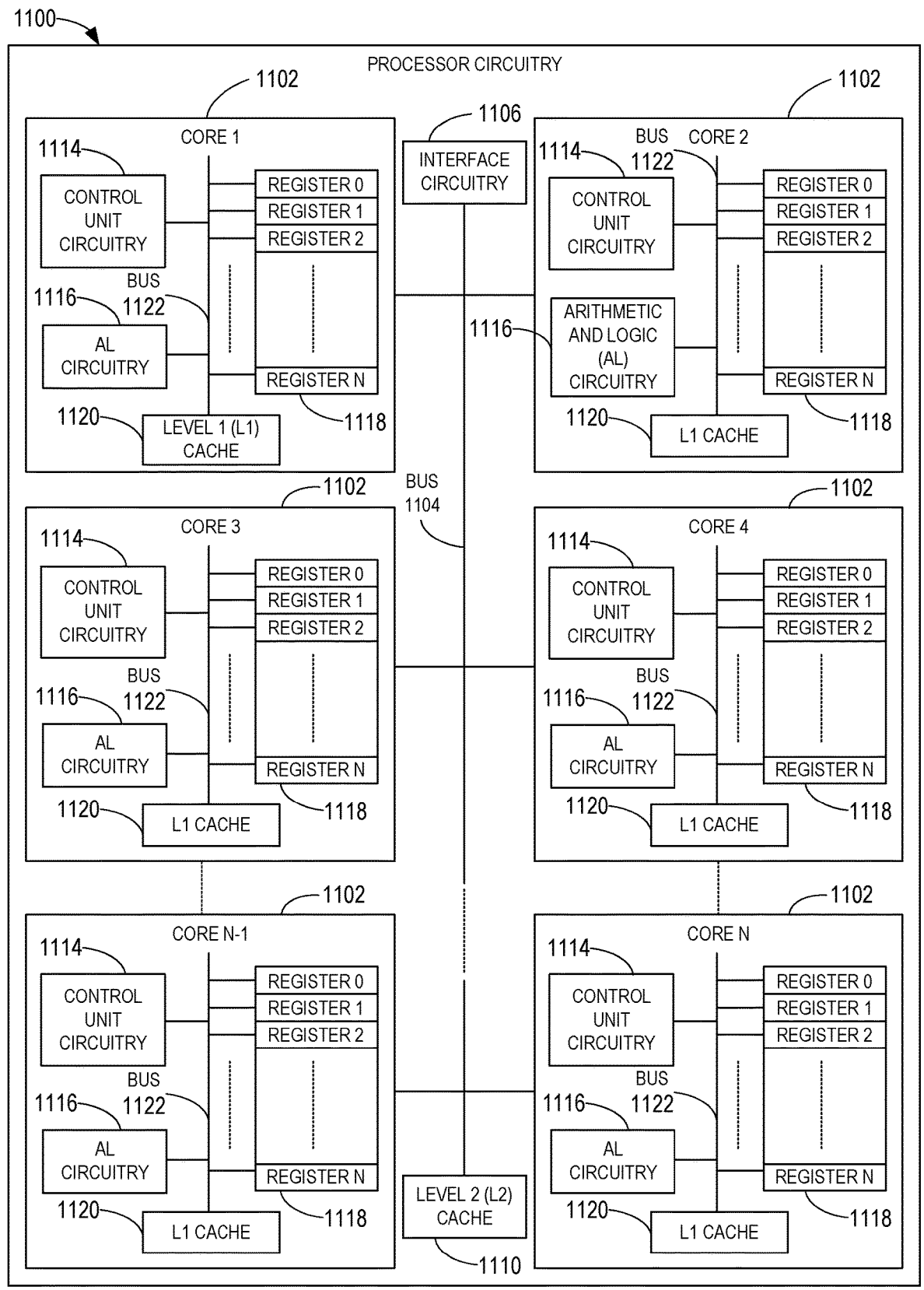
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 4 and/or 5.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_ cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
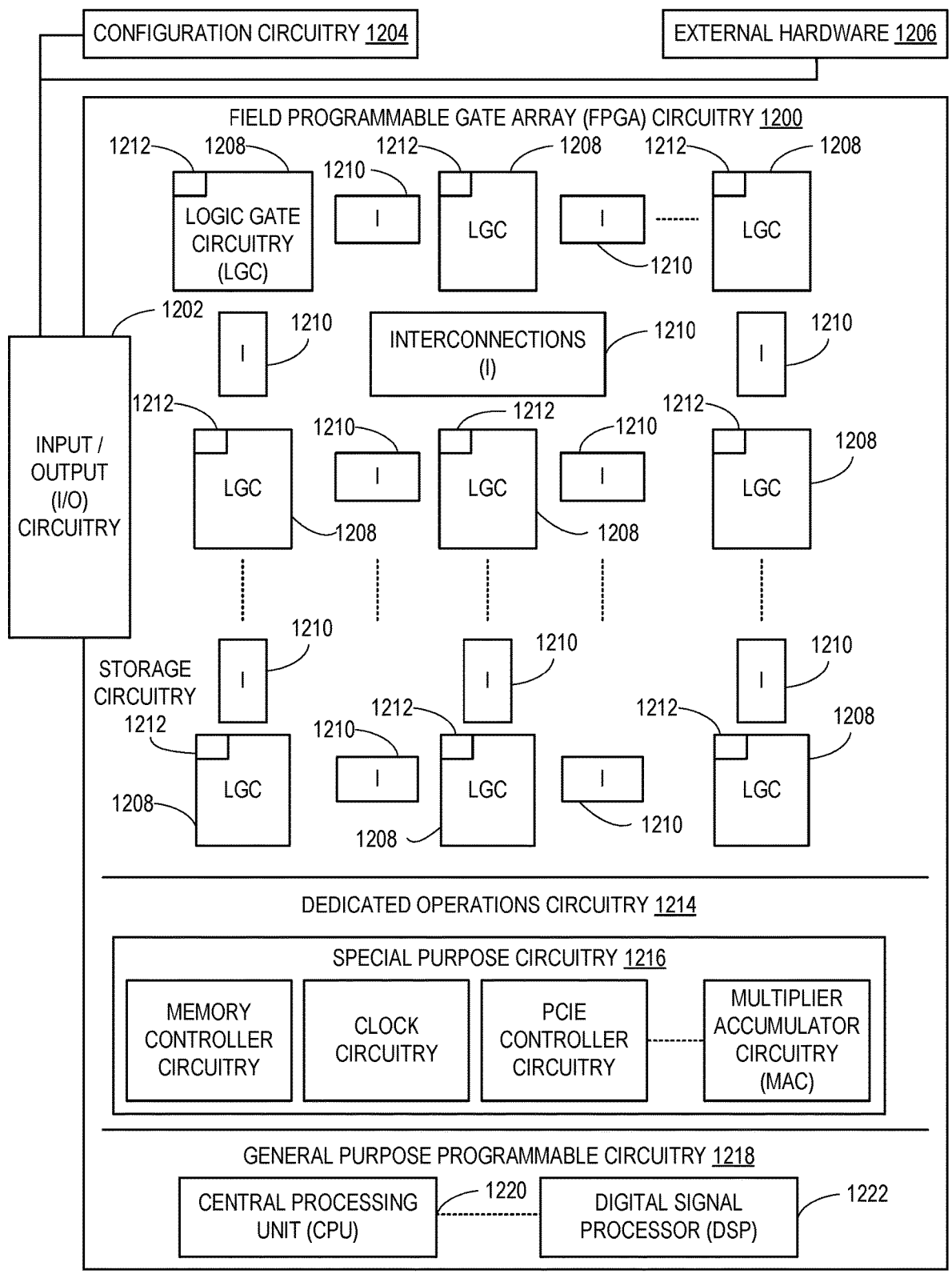
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1200 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowchart of FIGS. 4 and/or 5 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowchart of FIGS. 4 and/or 5. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowchart of FIGS. 4 and/or 5. As such, the FPGA circuitry 1200 may be structured to effectively instantiate some or all of the machine readable instructions of the flowchart of FIGS. 4 and/or 5 as dedicated logic circuits to perform the operations corresponding to those software instructions in a dedicated manner analogous to an ASIC. Therefore, the FPGA circuitry 1200 may perform the operations corresponding to some or all of the machine readable instructions of FIGS. 4 and/or 5 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1200 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 4 and/or 5 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowchart of FIGS. 4 and/or 5 may be executed by one or more of the cores 1102 of FIG. 11 and a second portion of the machine readable instructions represented by the flowchart of FIGS. 4 and/or 5 may be executed by the FPGA circuitry 1200 of FIG. 12.

In some examples, the processor circuitry 1012 of FIG. 10 may be in one or more packages. For example, the processor circuitry 1100 of FIG. 11 and/or the FPGA circuitry 1200 of FIG. 11 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
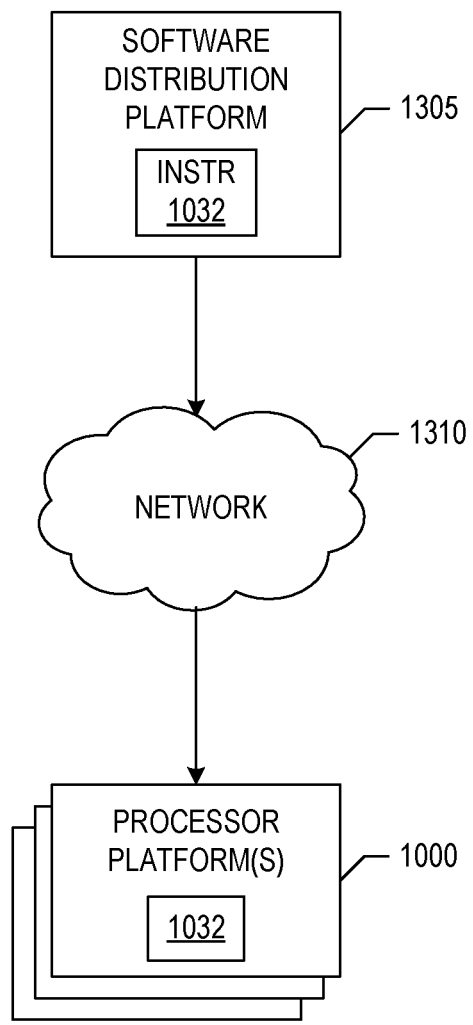
FIG. 13 is a block diagram of an example software distribution platform (e.g., one or more servers) to distribute software (e.g., software corresponding to the example machine readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1332 of FIG. 13 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1332, which may correspond to the example machine readable instructions 1332 of FIGS. 13, as described above. The one or more servers of the example software distribution platform 1305 are in communication with a network 1310, which may correspond to any one or more of the Internet and/or any of the example networks 1310 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1305. For example, the software, which may correspond to the example machine readable instructions 1332 of FIG. 13, may be downloaded to the example processor platform 1000, which is to execute the machine readable instructions 1332 to implement the central facility 110. In some example, one or more servers of the software distribution platform 1305 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that enable identification of streaming video on demand episodes that have not yet been identified. In this manner, other media identification techniques which are more time consuming and/or resource intensive can be avoided. The disclosed systems, methods, apparatus, and articles of manufacture improve the efficiency of using a computing device by enabling avoidance of expensive monitoring and/or identification operations. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to identify an episode number based on fingerprint and matched viewing information are disclosed herein. Further examples and combinations thereof include the following:

Example 1 includes an apparatus to identify fingerprint references for episodes in shows, the apparatus comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate bumper identification circuitry to process meter data to identify a presented show based on a bumper included in a show, filter circuitry to filter the meter data based on the identification of the show, selection circuitry to select a candidate episode, the candidate episode not associated with a known episode label, determination circuitry to determine whether the candidate episode appears sequentially after a known episode for a threshold number of presentation locations, and Labeler circuitry to label the candidate episode as the next sequential episode after the known episode in response to determining that the candidate episode appears sequentially after the known episode for the threshold number of presentation locations.

Example 2 includes the apparatus of example 1, wherein the bumper corresponds to a portion of the show that is repeated across multiple episodes of the show.

Example 3 includes the apparatus of example 2, wherein the portion of the show that is repeated across the multiple episodes of the show is an audio portion.

Example 4 includes the apparatus of example 1, further including organization circuitry to chronologically organize the filtered meter data.

Example 5 includes the apparatus of example 1, wherein the bumper is identified by fingerprint matching across known episodes of the same television show.

Example 6 includes the apparatus of example 1, wherein the candidate episode includes the same bumper as known episodes of a television show.

Example 7 includes the apparatus of example 1, wherein, the candidate episode is a first candidate episode, the known episode is a first known episode, and the labeling of the first candidate episode is to label the first candidate episode as a second known episode.

Example 8 includes the apparatus of example 7, wherein the selection circuitry is to select a second candidate episode, the second candidate episode not associated with a known episode label, the determination circuitry is to determine whether the second candidate episode appears sequentially after the second known episode for the threshold number of presentation locations, and the labeler circuitry is to label the second candidate episode as the next sequential episode after the second known episode in response to determining that the candidate episode appears sequentially after the second known episode for the threshold number of presentation locations.

Example 9 includes the apparatus of example 1, wherein the show is a streaming video on demand show.

Example 10 includes the apparatus of example 1, wherein an episode of the show is not identifiable using either codes or signatures at a time of processing of the meter data.

Example 11 includes at least one non-transitory computer readable storage medium comprising instructions that, when executed, cause at least one processor to at least access meter data, process the meter data to identify a presented show based on a bumper included in a show, filter the meter data based on the identification of the show, select a candidate episode, the candidate episode not associated with a known episode label, determine whether the candidate episode appears sequentially after a known episode for a threshold number of presentation locations, and label the candidate episode as the next sequential episode after the known episode in response to determining that the candidate episode appears sequentially after the known episode for the threshold number of presentation locations.

Example 12 includes the at least one non-transitory computer readable medium of example 11, wherein the bumper corresponds to a portion of the show that is repeated across multiple episodes of the show.

Example 13 includes the at least one non-transitory computer readable medium of example 12, wherein the portion of the show that is repeated across the multiple episodes of the show is an audio portion.

Example 14 includes the at least one non-transitory computer readable medium of example 11, wherein the instructions, when executed, cause the at least one processor to chronologically organize the filtered meter data.

Example 15 includes the at least one non-transitory computer readable medium of example 11, wherein the bumper is identified by fingerprint matching across known episodes of the same television show.

Example 16 includes the at least one non-transitory computer readable medium of example 11, wherein the candidate episode includes the same bumper as known episodes of a television show.

Example 17 includes the at least one non-transitory computer readable medium of example 11, wherein, the candidate episode is a first candidate episode, the known episode is a first known episode, and the labeling of the first candidate episode is to label the first candidate episode as a second known episode.

Example 18 includes the at least one non-transitory computer readable medium of example 17, wherein the instructions, when executed, cause the at least one processor to select a second candidate episode, the second candidate episode not associated with a known episode label, determine whether the second candidate episode appears sequentially after the second known episode for the threshold number of presentation locations, and label the second candidate episode as the next sequential episode after the second known episode in response to determining that the candidate episode appears sequentially after the second known episode for the threshold number of presentation locations.

Example 19 includes the at least one non-transitory computer readable medium of example 11, wherein the show is a streaming video on demand show.

Example 20 includes the at least one non-transitory computer readable medium of example 11, wherein an episode of the show is not identifiable using either codes or signatures at a time of processing of the meter data.

Example 21 includes an apparatus to identify fingerprint references for episodes in shows, the apparatus comprising means for accessing meter data, means for processing the meter data to identify a presented show based on a bumper included in a show, means for filtering the meter data based on the identification of the show, means for selecting a candidate episode, the candidate episode not associated with a known episode label, means for determining whether the candidate episode appears sequentially after a known episode for a threshold number of presentation locations, and means for labeling the candidate episode as the next sequential episode after the known episode in response to determining that the candidate episode appears sequentially after the known episode for the threshold number of presentation locations.

Example 22 includes the apparatus of example 21, wherein the bumper corresponds to a portion of the show that is repeated across multiple episodes of the show.

Example 23 includes the apparatus of example 22, wherein the portion of the show that is repeated across the multiple episodes of the show is an audio portion.

Example 24 includes the apparatus of example 21, further including means for chronologically organizing the filtered meter data.

Example 25 includes the apparatus of example 21, wherein the bumper is identified by fingerprint matching across known episodes of the same television show.

Example 26 includes the apparatus of example 21, wherein the candidate episode includes the same bumper as known episodes of a television show.

Example 27 includes the apparatus of example 21, wherein, the candidate episode is a first candidate episode, the known episode is a first known episode, and the labeling of the first candidate episode is to label the first candidate episode as a second known episode.

Example 28 includes the apparatus of example 27, wherein the means for selecting is to select a second candidate episode, the second candidate episode not associated with a known episode label, the means for determining is to determine whether the second candidate episode appears sequentially after the second known episode for the threshold number of presentation locations, and the means for labeling is to label the second candidate episode as the next sequential episode after the second known episode in response to determining that the candidate episode appears sequentially after the second known episode for the threshold number of presentation locations.

Example 29 includes the apparatus of example 21, wherein the show is a streaming video on demand show.

Example 30 includes the apparatus of example 21, wherein an episode of the show is not identifiable using either codes or signatures at a time of processing of the meter data.

Example 31 includes a method for identifying fingerprint references for episodes in shows, the method comprising accessing meter data, processing the meter data to identify a presented show based on a bumper included in a show, filtering the meter data based on the identification of the show, selecting a candidate episode, the candidate episode not associated with a known episode label, determining whether the candidate episode appears sequentially after a known episode for a threshold number of presentation locations, and labeling the candidate episode as the next sequential episode after the known episode in response to determining that the candidate episode appears sequentially after the known episode for the threshold number of presentation locations.

Example 32 includes the method of example 31, wherein the bumper corresponds to a portion of the show that is repeated across multiple episodes of the show.

Example 33 includes the method of example 32, wherein the portion of the show that is repeated across the multiple episodes of the show is an audio portion.

Example 34 includes the method of example 31, further including chronologically organizing the filtered meter data.

Example 35 includes the method of example 31, wherein the bumper is identified by fingerprint matching across known episodes of the same television show.

Example 36 includes the method of example 31, wherein the candidate episode includes the same bumper as known episodes of a television show.

Example 37 includes the method of example 31, wherein, the candidate episode is a first candidate episode, the known episode is a first known episode, and the labeling of the first candidate episode is to label the first candidate episode as a second known episode.

Example 38 includes the method of example 37, further including selecting a second candidate episode, the second candidate episode not associated with a known episode label, determining whether the second candidate episode appears sequentially after the second known episode for the threshold number of presentation locations, and labeling the second candidate episode as the next sequential episode after the second known episode in response to determining that the candidate episode appears sequentially after the second known episode for the threshold number of presentation locations.

Example 39 includes the method of example 31, wherein the show is a streaming video on demand show.

Example 40 includes the method of example 31, wherein an episode of the show is not identifiable using either codes or signatures at a time of processing of the meter data.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to identify fingerprint references of episodes in media, the apparatus comprising:
   memory storing instructions; and
   a processor to execute the instructions to:
      identify, based on meter data, a presented media based on a bumper;
      filter the meter data based on the identification of the presented media;
      select a candidate episode, the candidate episode not associated with a known episode label;
      determine whether the candidate episode appears sequentially after a known episode for a threshold number of presentation locations; and
      label the candidate episode as a next sequential episode after the known episode in response to determining that the candidate episode appears sequentially after the known episode for the threshold number of presentation locations.

2. The apparatus of claim 1, wherein the bumper corresponds to a portion of the presented media that is repeated across multiple episodes.

3. The apparatus of claim 2, wherein the portion of the presented media that is repeated across the multiple episodes is an audio portion.

4. The apparatus of claim 1, wherein the processor is further to chronologically organize the filtered meter data.

5. The apparatus of claim 1, wherein the processor is to identify the bumper using fingerprint matching across known episodes of a television show, the known episodes of the television show including the known episode.

6. The apparatus of claim 1, wherein the bumper of the candidate episode is a same bumper included in known episodes of a television show, the known episodes of the television show including the known episode.

7. The apparatus of claim 1, wherein, the candidate episode is a first candidate episode, the known episode is a first known episode, and the labeling of the first candidate episode is to label the first candidate episode as a second known episode.

8. The apparatus of claim 7, wherein the processor is further to:
   select a second candidate episode, the second candidate episode not associated with a known episode label;
   determine whether the second candidate episode appears sequentially after the second known episode for the threshold number of presentation locations; and
   label the second candidate episode as the next sequential episode after the second known episode in response to determining that the candidate episode appears sequentially after the second known episode for the threshold number of presentation locations.

9. The apparatus of claim 1, wherein the presented media is a streaming video on demand show.

10. The apparatus of claim 1, wherein the candidate episode is not identifiable using either codes or fingerprint matching at a time of processing of the meter data.

11. An apparatus to identify fingerprint references for episodes in media, the apparatus comprising:
    means for processing meter data to identify presented media based on a bumper;
    means for filtering the meter data based on the identification of the presented media;
    means for selecting a candidate episode, the candidate episode not associated with a known episode label;
    means for determining whether the candidate episode appears sequentially after a known episode for a threshold number of presentation locations; and
    means for labeling the candidate episode as the next sequential episode after the known episode in response to determining that the candidate episode appears sequentially after the known episode for the threshold number of presentation locations.

12. The apparatus of claim 11, wherein the bumper corresponds to a portion of the presented media that is repeated across multiple episodes.

13. The apparatus of claim 12, wherein the portion of the presented media that is repeated across the multiple episodes is an audio portion.

14. The apparatus of claim 11, further including means for chronologically organizing the filtered meter data.

15. The apparatus of claim 11, wherein the bumper is identified by fingerprint matching across known episodes of a television show, the known episodes of the television show including the known episode.

16. The apparatus of claim 11, wherein the bumper of the candidate episode is a same bumper included in known episodes of a television show, the known episodes of the television show including the known episode.

17. The apparatus of claim 11, wherein, the candidate episode is a first candidate episode, the known episode is a first known episode, and the labeling of the first candidate episode is to label the first candidate episode as a second known episode.

18. The apparatus of claim 17, wherein:
    the means for selecting is to select a second candidate episode, the second candidate episode not associated with a known episode label;
    the means for determining is to determine whether the second candidate episode appears sequentially after the second known episode for the threshold number of presentation locations; and
    the means for labeling is to label the second candidate episode as the next sequential episode after the second known episode in response to determining that the candidate episode appears sequentially after the second known episode for the threshold number of presentation locations.

19. The apparatus of claim 11, wherein the presented media is a streaming video on demand show.

20. The apparatus of claim 11, wherein the candidate episode of the presented media is not identifiable using either codes or fingerprint matching at a time of processing of the meter data.

21. A method for identifying fingerprint references for episodes in media, the method comprising:
    identifying, based on meter data, a presented media based on a bumper;

filtering the meter data based on the identification of the presented media;

selecting a candidate episode, the candidate episode not associated with a known episode label;

determining whether the candidate episode appears sequentially after a known episode for a threshold number of presentation locations; and labeling the candidate episode as the next sequential episode after the known episode in response to determining that the candidate episode appears sequentially after the known episode for the threshold number of presentation locations.

22. The method of claim 21, wherein the bumper corresponds to a portion of the presented media that is repeated across multiple episodes.

23. The method of claim 22, wherein the portion that is repeated across the multiple episodes is an audio portion.

24. The method of claim 21, further including chronologically organizing the filtered meter data.

25. The method of claim 21, wherein the bumper is identified by fingerprint matching across known episodes of a television show, the known episodes of the television show including the known episode.

26. The method of claim 21, wherein the bumper of the candidate episode is a same bumper included in known episodes of a television show, the known episodes of the television show including the known episode.

27. The method of claim 21, wherein, the candidate episode is a first candidate episode, the known episode is a first known episode, and the labeling of the first candidate episode is to label the first candidate episode as a second known episode.

28. The method of claim 27, further including:

selecting a second candidate episode, the second candidate episode not associated with a known episode label;

determining whether the second candidate episode appears sequentially after the second known episode for the threshold number of presentation locations; and labeling the second candidate episode as the next sequential episode after the second known episode in response to determining that the candidate episode appears sequentially after the second known episode for the threshold number of presentation locations.

29. The method of claim 21, wherein the presented media is a streaming video on demand show.

30. The method of claim 21, wherein the candidate episode of the presented media is not identifiable using either codes or fingerprint matching at a time of processing of the meter data.

* * * * *